United States Patent [19]

Iida et al.

[11] 4,394,688
[45] Jul. 19, 1983

[54] VIDEO SYSTEM HAVING AN ADJUSTABLE DIGITAL GAMMA CORRECTION FOR CONTRAST ENHANCEMENT

[75] Inventors: Hitoshi Iida, Bedford; Pay-Shin King, Newton, both of Mass.

[73] Assignee: Hamamatsu Systems, Inc., Waltham, Mass.

[21] Appl. No.: 296,068

[22] Filed: Aug. 25, 1981

[51] Int. Cl.³ .................... H04N 5/14; H04N 5/20
[52] U.S. Cl. .................... 358/160; 358/164; 358/163; 358/166; 358/169; 382/54
[58] Field of Search ............ 358/160, 163, 164, 166, 358/37, 168, 169, 903, 111; 364/515

[56] References Cited

U.S. PATENT DOCUMENTS

| | | | |
|---|---|---|---|
| 3,800,078 | 3/1974 | Cochran et al. | 358/166 X |
| 4,148,070 | 4/1979 | Taylor | 358/160 |
| 4,242,707 | 12/1980 | Budai | 358/160 |
| 4,335,427 | 6/1982 | Hunt et al. | 358/166 X |

*Primary Examiner*—Robert L. Richardson
*Attorney, Agent, or Firm*—Irving M. Kriegsman

[57] ABSTRACT

A video system having a television camera, a digital video signal processor coupled to the output of the television camera and a television monitor coupled to the output of the digital video signal processor is disclosed. The digital video signal processor includes an analog to digital converter for converting analog video signals into video data, a frame memory processor for processing and temporarily storing the video data, a random access memory device in which the video data is altered in accordance with the contents of a table-look-up temporarily written therein, a read only memory device containing a plurality of different table-look-ups, each table-look-up containing data representing a different gamma correction, a central processing unit for obtaining a table-look-up from the read only memory device and then writing the table-look-up into the random access memory device and a manually operated control device coupled to the central processing unit for selecting which table-look-up is read out from the read only memory device and then written into the random access memory device and a digital to analog converter for converting the processed video data into analog video signals.

9 Claims, 1 Drawing Figure

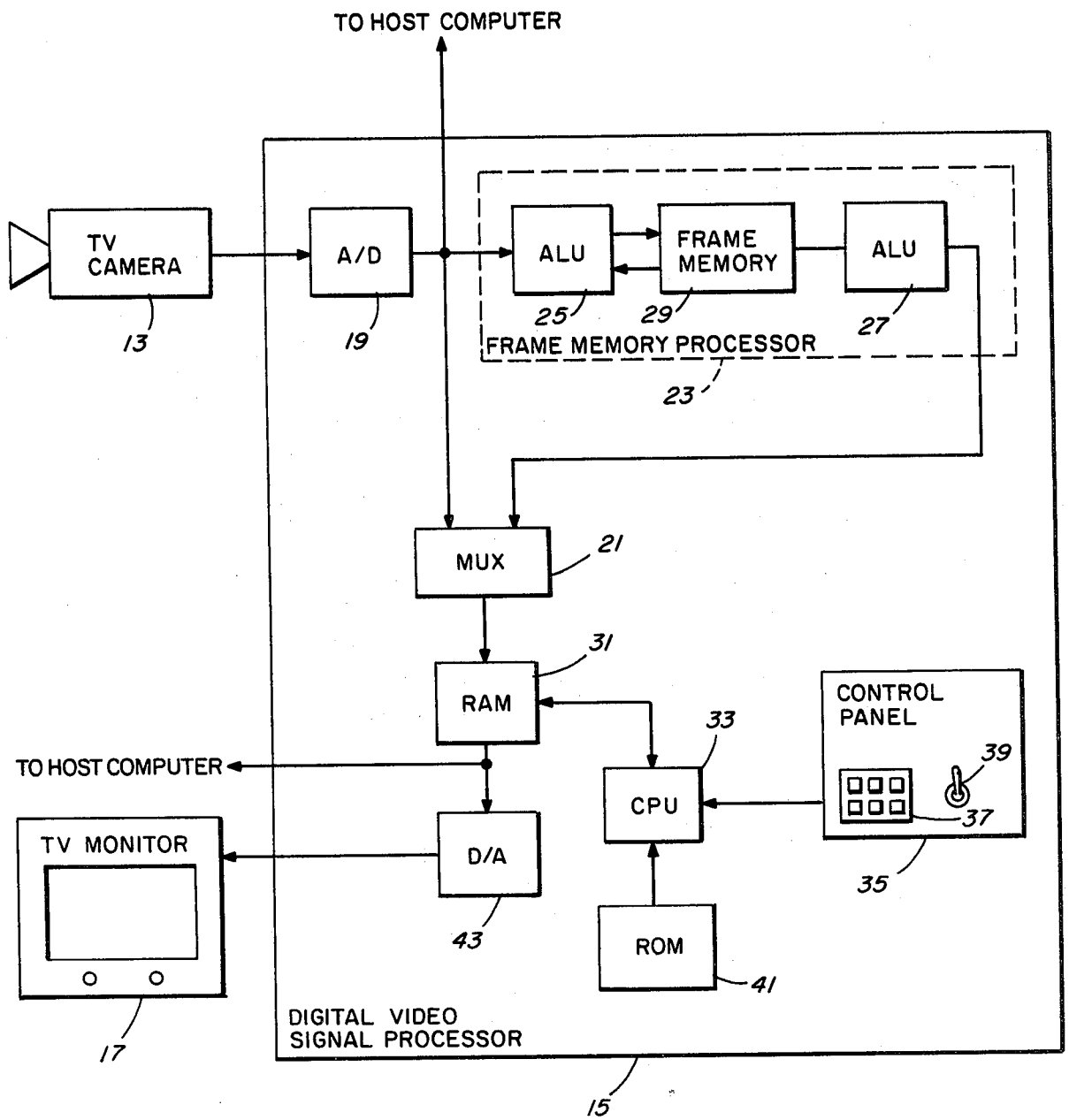

VIDEO SYSTEM HAVING AN ADJUSTABLE DIGITAL GAMMA CORRECTION FOR CONTRAST ENHANCEMENT

BACKGROUND OF THE INVENTION

The present invention relates generally to video systems and more particularly to a video system which includes an adjustable digital gamma correction which is used to selectively emphasize or enhance the contrast of a video picture over different regions of interest.

In a television system the relationship between the brightness of a portion of an object and the brightness of the corresponding portion of the image is generally expressed by the formula:

$$y = x^\gamma$$

where y is the magnitude of the output signal, x is the magnitude of the input signal and $\gamma$ is the power, referred to as the gamma, to which x must be raised to be equal to y. In order to determine the overall gamma of a television system, the gamma of the television camera and the gamma of the television monitor or receiver are multiplied together. In an ideal or distortionless system the overall gamma is 1.0. Unfortunately, in most all television cameras the gamma (which is determined by the composition of the photosensitive material in the vidicon) is between around 0.6 to 0.5 while in most all television monitors the gamma (which is determined by the composition of the phosphorescent material in the screen) is designed to be about 2.2. Consequently, the overall gamma is normally not equal to 1.0 and the contrast of the resulting image is somewhat distorted (i.e. in certain areas the contrast is greater than it should appear and in other areas the contrast is less than it should appear).

In order to correct for this distortion, a type of analog electrical circuit called a gamma correction circuit is normally incorporated into the system. The circuit provides a gamma which when multiplied together with the gamma of the television camera and the gamma of the television monitor produces an overall gamma in the system of around 1.0. These gamma correction circuits are normally built into the television camera or a control module for the television camera and are usually adjustable within a small range, such as from 0.85 to 1.0, to compensate for variations that may be present in the gamma of the particular vidicon tube used in the television camera. Once set to the particular value needed to produce an overall gamma of 1.0 (or as close to 1.0 as is possible), the gamma of the gamma correction circuit is generally not changed. However, in some closed circuit television systems used for surveillance purposes it is known to provide a knob or other manually adjustable means at the television monitor for adjusting the gamma produced by the gamma correction circuit for the purpose of intentionally distorting the contrast over areas of interest where the lighting is poor and the resulting image difficult to perceive. The amount of intentional distortion that can be produced, however, is limited to the small range of adjustability in the analog gamma correction circuit.

It is known to intentionally distort the contrast of an image formed in video microscope systems used in industrial and research applications to examine characteristics and properties of very small objects in order to improve the visibility of the objects being examined by selectively manipulating the gain and offset knobs in the video camera and the diaphragm and compensator settings in the microscope. An example of this technique of contrast enhancement may be found in a publication entitled Video-Enhanced Contrast Polarization (AVEC-POL) Microscopy appearing in Cell Motility 1:275-289 (1981), Alan R. Liss, Inc.

It is also known to convert analog video signals into video data for temporary or permanent storage and/or digital signal image processing. One known type of digital signal image processing that is often performed to improve the quality of an image is noise reduction. An example of a known digital type image processing system may be found in U.S. Pat. No. 4,240,113, to Michael et al. Another example of a digital image processing system is described in Hamamatsu Systems Inc. Product Bulletin/2001 Rev. 2 2-81.

It is an object of this invention to provide a new and improved video system which is especially suited for use in, but not exclusively limited to, industrial and research applications.

It is another object of this invention to provide a novel method and system for selectively manipulating the contrast of a video image.

It is a further object of this invention to provide a video system having an adjustable digital gamma correction.

It is yet still another object of this invention to provide a novel method and system for selectively manipulating the contrast of a video image over low intensity areas.

It is a further object of this invention to provide a novel method and system for selectively manipulating the contrast of a video image over high intensity areas.

It is yet still another object of this invention to provide a video system in which the gamma is adjustable and useable over a range from 0.1 or lower to 3.0 or higher.

It is another object of this invention to provide a system and method for digitally adjusting the gamma of a video system in order to provide contrast enhancement in selected areas of interest.

SUMMARY OF THE INVENTION

A video system constructed according to the teachings of the present invention includes a television camera, a digital video signal processor coupled to the output of the television camera and a television monitor coupled to the output of the digital video signal processor. The digital video signal processor includes an analog to digital converter for converting analog video signals from the television camera into video data, a random access memory device through which the video data is passed and in which the video data is altered in accordance with the contents of a table-look-up temporarily written therein, a read only memory device containing a plurality of different table-look-ups for use in the random access memory device, each table-look-up containing data representing a different gamma correction, a central processing unit for obtaining a table-look-up from the read only memory device and then writing the table-look-up so obtained into the random access memory device in response to control signals applied thereto, a manually operated control device for applying control signals to the central processing unit for selecting which table-look-up is read out from the read only memory device and then written into the random access memory device and an analog to digital converter for converting the processed video data into analog video signals. In the operation of the digital video system, the contrast of the video picture appearing the television monitor is adjusted for optimum viewing conditions over an area of interest by changing the particular table-look-up in the random access memory device until the most favorable picture is produced.

The foregoing and other objects as well as many advantages of the invention will appear from the description to follow. In the description, reference is made to the accompanying drawings which form a part thereof, and in which is shown by way of illustrating, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts, the sole FIGURE is a simplified block diagram of a video system including a digital video signal processor constructed according to the principles of the present invention.

DETAILED DESCRIPTION OF PREFERRED EMBODIMENT

Referring now to the drawings, there is illustrated in the sole FIGURE a simplified block diagram of a video system constructed according to the teachings of the present invention and identified generally by reference numeral 11.

Video system 11 includes a television camera 13 for generating analog video signals of an object or scene (or an optical image of an object or scene such as may be formed by a microscope), a digital video signal processor 15 for digitally processing the video signals obtained from the TV camera 13 and a television monitor 17 for displaying an image of the processed video signals.

The digital video signal processor 15 includes an analog to digital converter 19 for converting the analog video signals from TV camera 13 into video data. The video data from analog to digital converter 19 is transmitted to one of two inputs of a multiplexer 21 and to the input of a frame memory processor 23. The video data from analog to digital converter 19 may also be transmitted to a host or main computer (not shown) for permanent storage and processing, if desired.

In the frame memory processor 23, video data of a single frame is temporarily stored and processed either before or after storage. The frame memory processor 23 is shown in the FIGURE as including a pair or arithmetic logic units 25 and 27 and a frame memory 29. Frame memory processor 23 performs various known arithmetic type video signal processing functions, such as summing, averaging or differencing, the particular construction of frame memory processor 23 to perform these functions for purposes such as noise reduction not being considered a part of the invention and the particular components shown therein being for illustrative purposes only. Frame memory 29 may comprise a pair of Intel chips number 2117. An example of a known frame memory processor capable of performing adding, substracting and averaging type signal processing is described in the above referenced Hamamatsu Systems Inc. Product Bulletin/2001, Revision 2, 2/81. The output of the frame memory processor 23 is transmitted to the other input of multiplexer 21.

The video data from multiplexer 21, which is obtained either from analog to digital converter 19 or frame memory processor, is transmitted to a high speed random access memory device 31, where it is modified by a table-look-up which is temporarily written therein. Random access memory device 31 may comprise a pair of Fairchild chips number 93L422 and conventional associated logic circuitry. Random access memory device 31 is loaded with the table-look-up which is used to modify the video data from a central processing unit (CPU) 33 which controls the overall operations of the digital video signal processor 15 through signals sent over appropriate control lines (not shown). CPU 33 may be, for example, an Intel chip number 8080. The program for operating CPU 33 is stored in a memory (not shown) and instructions for executing the operating program are entered through a manually operated control panel 35 which includes a keyboard 37 and a joystick 39.

The table-look-up which is sent to random access memory device from CPU 33 is obtained from a bank of different table-look-ups permanently stored in a read only memory device 41 which is coupled to CPU 33. Each one of the table-look-ups in memory device 41 is for a different gamma correction. For example, there may be a bank of thirty table-look-ups, with each table-look-up having a different gamma correction, the smallest gamma correction table being 0.1 or smaller and the largest gamma correction table being 3.0 or larger. As can be appreciated, if the gamma resulting from TV camera 13 and TV monitor 17 is, for example, 1.32 a set of gamma correction tables having a range of 0.1 to 3.0 will enable the overall gamma to be changed from 0.132 to 3.966. Read only memory device 41 may comprise a pair of Intel chips number 2716 and associated logic circuitry.

The modified output data from random access memory device 31 is fed into a digital to analog converter 43 where it is converted into analog video signals. The modified output data may also be sent to the host computer, if desired. The image corresponding to the video output signals from digital to analog converter 43 is displayed on TV monitor 17.

In the operation of the digital video signal processor 15, the particular table-look-up that is read out from the read only memory device 41 and written into the random access memory is controlled through the manually operated control panel 35. For example, the CPU 33 may be programmed so that the specific table-look-up written into the random access memory 31 from the read only memory 41 is determined by the angular position of the joy stick 39. Alternatively CPU 33 may be programmed so that different look-up-tables can be moved from read only memory 41 to random access memory 31 by depressing different keys or combinations of keys on the keyboard 37. As can be appreciated, the gamma correction applied to the video data can thus be very easily and very quickly changed over a range limited solely the number of different tables stored in the read only memory device 41 and the gamma values preselected for the individual tables.

In using the digital video signal processor 15 to manipulate contrast, data sent to multiplexer 21 either directly from analog to digital converter 19 or from frame memory processor 23 is fed from multiplexer 21 into random access memory 31, the particular data selected being controlled by CPU 33. The gamma correction table inserted into random access memory device 31 is than changed until the most favorable image is formed on the screen of the TV monitor 17. By changing the gamma correction over a portion of or over the entire range of table-look-ups, areas of interest in the resulting picture may be seen which might not otherwise be visually perceptible.

As is known, for certain applications such as viewing video pictures of X-rays, it is benefical to emphase contrast in low intensity areas while in other applications such as in video microscopy it is beneficial to emphasize contrast in high intensity areas. Thus, in certain instances low gamma corrections are desirable while in other instances high gamma corrections are desirable.

As is also known, at very high or very low gammas, noise represents a problem that can very adversely effect the resulting picture. However, by processing the video data through frame memory processor 23, the noise can be easily reduced or substantially eliminated. Therefore, when using very high or very low gammas, the video data should be processed for noise reduction in the frame memory processor 23.

The above description is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed is:

1. A video system comprising a television camera for converting visual information into analog video signals, a digital video signal processor for digitally processing said anolog video signals and a television monitor for displaying an image of the processed analog video signals, said digital video signal processor including:
   a. an analog to digital converter for converting the analog video signals into video data,
   b. a first memory device for modifying the video data according to the particular contents contained therein,
   c. a second memory device, said second memory device having stored therein a plurality of table-look-ups, each table-look-up corresponding to a different gamma correction,
   d. a central processing unit for controlling the operations of the digital video signal processor, said operations including reading out one of said table-look-ups in said second memory device and writing said read data into said first memory device,
   e. a manually operated control device for controlling the operations of the central processing unit, said control device including means for selecting the particular table-look-ups to be read by said central processing unit, and
   f. a digital to analog converter for converting the modified video data from said first memory device into analog video signals.

2. The video system of claim 1 and wherein said first memory device comprises a pair of high speed RAMS.

3. The video system of claim 1 and further including a frame memory processor for processing and/or storing a single frame.

4. The video system of claim 1 and wherein the means for selecting the particular table-look-up to be read by the central processing unit comprises a joystick.

5. A method of manipulating video picture data for the purpose of enhancing contrast over certain areas of interest comprising:
   a. passing said video picture data through a first memory device which is arranged to modify the video picture data according to the contents of a table-look-up contained therein,
   b. providing a second memory device having therein a plurality of different table-look-ups, each table-look-up corresponding to a different gamma correction, and
   c. selectively reading out one of said table-look-ups from said second memory device and writing said table-look-up so read into said first memory device.

6. A digital video signal processor for processing analog video signals comprising:
   a. an analog to digital converter for converting the analog video signals into video data,
   b. a first memory device for modifying the video data according to the particular contents contained therein,
   c. a second memory device having therein a plurality of table-look-ups, each table-look-up constituting a different gamma correction,
   d. a central processing unit for moving one of the table-look-ups from the second memory device to the first memory device and
   e. control means for selecting which table-look-up is moved from the second memory device to the first memory device.

7. A digital video signal processor according to claim 6 and wherein said first memory device comprises a pair of high speed RAMS.

8. A digital video signal processor according to claim 6 and wherein including a frame memory processor for processing and/or storing a single frame.

9. A digital video signal processor according to claim 6 and wherein the means for selecting the particular table-look-up to be read by the central processing unit comprises a joystick.

* * * * *